US008046812B2

(12) United States Patent
Noiri et al.

(10) Patent No.: US 8,046,812 B2
(45) Date of Patent: *Oct. 25, 2011

(54) CATV SYSTEM, MANAGEMENT DEVICE, CABLE MODEM, SET-TOP BOX AND PROGRAM

(75) Inventors: Shinsuke Noiri, Nisshin (JP); Hirotaka Naruse, Nisshin (JP)

(73) Assignee: Masprodenkoh Kabushikikaisha, Aichi-Ken (JP)

( * ) Notice: Subject to any disclaimer, the term of this patent is extended or adjusted under 35 U.S.C. 154(b) by 72 days.

This patent is subject to a terminal disclaimer.

(21) Appl. No.: 11/529,109

(22) Filed: Sep. 28, 2006

(65) Prior Publication Data

US 2007/0113254 A1    May 17, 2007

(51) Int. Cl.
*H04N 7/173* (2006.01)
(52) U.S. Cl. .................... 725/105; 725/107; 725/111
(58) Field of Classification Search .................. 725/111, 725/105, 107
See application file for complete search history.

(56) References Cited

U.S. PATENT DOCUMENTS

| | | | | |
|---|---|---|---|---|
| 4,787,085 A | * | 11/1988 | Suto et al. | 725/144 |
| 5,471,617 A | * | 11/1995 | Farrand et al. | 718/100 |
| 5,651,006 A | * | 7/1997 | Fujino et al. | 370/408 |
| 6,018,767 A | * | 1/2000 | Fijolek et al. | 725/111 |
| 6,223,222 B1 | * | 4/2001 | Fijolek et al. | 709/227 |
| 6,588,016 B1 | * | 7/2003 | Chen et al. | 725/111 |
| 6,839,355 B1 | * | 1/2005 | Saby et al. | 725/111 |
| 7,269,837 B1 | * | 9/2007 | Redling et al. | 725/51 |
| 2001/0017862 A1 | * | 8/2001 | Tokuyo et al. | 709/227 |
| 2003/0106067 A1 | * | 6/2003 | Hoskins et al. | 725/111 |
| 2004/0197082 A1 | * | 10/2004 | Yim | 725/58 |
| 2005/0183130 A1 | * | 8/2005 | Sadja et al. | 725/107 |

FOREIGN PATENT DOCUMENTS

| | | |
|---|---|---|
| JP | 9331325 | 12/1997 |
| JP | H09-331325 A | 12/1997 |
| JP | 2002288055 | 10/2002 |
| JP | 2003018151 | 1/2003 |
| JP | 2004254102 | 9/2004 |
| JP | 2004-282210 | 10/2004 |
| JP | 2004-282210 A | 10/2004 |
| JP | 2005033427 | 2/2005 |

OTHER PUBLICATIONS

Decision of Rejection, dated Aug. 10, 2010, issued in Japanese Patent Application No. 2005-179518 which corresponds to the U.S. Appl. No. 11/529,109. 2 pages.
English translation of the Decision of Rejection, dated Aug. 10, 2010. 2 pages.
Decision of Rejection, dated Sep. 14, 2010, issued in Japanese Patent Application No. 2005-179519 which corresponds to the U.S. Appl. No. 11/529,110. 3 pages.
English translation of the Decision of Rejection, dated Sep. 14, 2010. 2 pages.
Background Material 1: Unexamined Japanese Patent Application Publication No. H09-107376 (Pub. Date: Apr. 22, 1997). 5 pages.

* cited by examiner

*Primary Examiner* — Brian Pendleton
*Assistant Examiner* — Fernando Alcon (57) ABSTRACT

A cable modem of a CATV system includes a proxy requesting unit. The proxy requesting unit requests a set top box to send relevant information about the set top box when the cable modem is requested to send the relevant information from at least one management device connected to the cable modem via a CATV network.

17 Claims, 5 Drawing Sheets

CATV SYSTEM, MANAGEMENT DEVICE, CABLE MODEM, SET-TOP BOX AND PROGRAM

CROSS-REFERENCE TO RELATED APPLICATIONS

The disclosure of Japanese Patent Application No. 2005-179518 filed to the Japan Patent Office is incorporated herein by reference.

TECHNICAL FIELD OF THE INVENTION

This invention relates to a CATV system that requests a set top box to send relevant information about the set top box.

BACKGROUND

In a conventional CATV (Cable Television) system, as disclosed in Unexamined Japanese Patent Publication No. 2004-282210,various techniques are proposed to gather relevant information (including status information) about a set top box (a CATV transceiver) connected to a CATV network from the set top box.

Recently, a system that gathers relevant information about the set top box connected to the CATV network via a cable modem by a management device connected to the CATV network has been proposed.

In such a conventional system, in general, an IP address which is assigned to the cable modem is managed by the management device side, whereas an IP address which is assigned to the set top box connected to the cable modem is not managed by the management device side.

This is because the set top box differs from the cable modem in ways that the set top box is not always connected to the CATV network via the cable modem and is not always booted.

In other words, each time the set top box is booted while being connected to the CATV network, an IP address to be assigned to the set top box may be changed. Thereby, processing load for managing the IP address in the management device increases.

SUMMARY

In the system described above, the management device needs to verify the IP address of the set top box each time the management device requests the set top box to send the relevant information.

That is, the management device needs to perform an additional process such as checking a lending log of a DHCP (Dynamic. Host Configuration Protocol) server, each time the management device requests the set top box to send the relevant information.

Therefore, the purpose of this invention is to request a set top box to send relevant information without increasing processing load of a management device.

In a first aspect of the present invention, a CATV system is provided with at least one management device, at least one cable modem connected to the management device via a CATV network, and at least one set top box connected to the cable modem. These apparatuses are configured as below.

The management device is provided with a relevant information requesting unit that requests the cable modem to send relevant information about the set top box.

The cable modem is provided with a proxy requesting unit that requests the set top box to send the relevant information when the cable modem is requested to send the relevant information from the management device.

The set top box is provided with a relevant information sending unit that retrieves the relevant information from a preserved memory area and sends the relevant information to a preassigned addressee when the set top box is requested to send the relevant information from the cable modem.

In this CATV system, the cable modem requests the set top box to send the relevant information by proxy for the management device. Thereby, there is only need for the management device to manage an address of the cable modem and is no need for the management device to verify an address of the set top box when the management device requests to send the relevant information.

Therefore, this CATV system enables to request the set top box to send the relevant information without increasing processing load of the management device.

The management device may be provided with a relevant information gathering unit that gathers the relevant information from the addressee of the relevant information sent from the set top box.

In this case, the management device can not only request to send the relevant information, but also gather the relevant information.

In the meantime, the relevant information sending unit of the set top box can be assigned with any addressee for the relevant information.

For example, the relevant information sending unit of the set top box may be assigned with the cable modem as an addressee for the relevant information. At the same time, the cable modem may be provided with a proxy sending unit that receives the relevant information sent from the set top box and sends the relevant information to the management device.

This enables the cable modem to not only request the set top box to send the relevant information by proxy for the management device, but also receive the relevant information from the set top box by proxy for the management device and send the relevant information to the management device.

In other words, the management device enables to gather the relevant information without increasing processing load of the management device.

The relevant information requesting unit of the management device may request the cable modem to send the relevant information in accordance with a first transmission procedure.

Moreover, the proxy requesting unit of the cable modem may request the set top box to send the relevant information in accordance with a second transmission procedure, which differs from the first transmission procedure.

Furthermore, the relevant information gathering unit of the management device may gather the relevant information from the cable modem in accordance with the first transmission procedure.

Also, the proxy sending unit of the cable modem may receive the relevant information from the set top box in accordance with the second transmission procedure and send the relevant information to the management device in accordance with the first transmission procedure.

If each unit of the management device and each unit of the cable modem are set as such, the transmission between the cable modem and the set top box is performed in accordance with the second transmission procedure, which differs from the first transmission procedure, and thereby the address of the set top box can be specifically set.

That is, there is no need for the management device to verify or update the address of the set top box when the management device requests to send the relevant information and gathers the relevant information from the cable modem.

The first and second transmission procedures can be any transmission procedures.

For example, the first transmission procedure may be usable for the CATV network, and the second transmission procedure may be usable for the network, which is formed virtually between the cable modem and the set top box.

If the first and second transmission procedures differ from one another as such, the CATV system can prohibit leaking out a content of the transmission between the cable modem and the set top box to the outside of the CATV system via the CATV network and thus the management device. Furthermore, the CATV system can prohibit consuming a band area of the CATV network unnecessary.

In this case, the management device, the cable modem and the set top box may be set with the address as described below.

Specifically, the management device may be set with the address of the cable modem, which is valid in the first transmission procedure. Moreover, the cable modem may be set with the address of the management device, which is valid in the first transmission procedure and the address of the set top box, which is valid in the second transmission procedure. Furthermore, the set top box may be set with the address of the cable modem, which is valid in the second transmission procedure.

When the addresses are set as such, the virtual network between the cable modem and the set top box can be reliably independent from the CATV network.

Moreover, in a second aspect of the present invention, a management device is provided with a relevant information requesting unit that requests at least one cable modem connected to the management device via the CATV network to send relevant information about at least one set top box connected to the cable modem.

According to the management device, a portion of the above mentioned the CATV system can be realized.

Moreover, this management device may be provided with a relevant information gathering unit that gathers the relevant information from the addressee of the relevant information sent from the set top box.

Moreover, in a third aspect of the present invention, a cable modem is provided with a proxy requesting unit that requests a set top box to send the relevant information about the set top box, when the cable modem is requested to send the relevant information from at least one management device connected to the cable modem via the CATV network.

According to the cable modem, a portion of the above mentioned the CATV system can be realized.

Moreover, this cable modem may be provided with a proxy sending unit that receives the relevant information from the set top box and sends the relevant information to the management device.

Furthermore, in a fourth aspect of the present invention, a set top box is provided with a relevant information sending unit that retrieves relevant information about the set top box from a prereserved memory area and sends the relevant information to a preassigned addressee, when the set top box is requested to send the relevant information from the cable modem connected to the set top box.

According to the set top box, a portion of the above mentioned the CATV system can be realized.

Moreover, the set top box can be separated from the cable modem or integrated with the cable modem.

If the set top box is integrated with the cable modem, the connection between the cable modem and the set top box is fixed, and thereby addresses of the cable modem and the set top box in the second transmission procedure can be preset.

For example, if these addresses are preset in the set top box at the time of factory shipment, there is no need for a user to set these addresses in the set top box. Thereby, workload of the user can be relieved when the user uses the CATV system of the present invention. Moreover, this CATV system of the present invention can be easily used by a user who has insufficient knowledge of setting an address.

In a fifth aspect of the present invention, a program is to make a computer function as the relevant information requesting unit of the management device.

According to this program, the computer can be functioned as the relevant information requesting unit.

In a sixth aspect of the present invention, a program is to make a computer function as the relevant information gathering unit of the management device.

According to this program, the computer can be functioned as the relevant information gathering unit.

In a seventh aspect of the present invention, a program is to make a computer function as the proxy requesting unit of the cable modem of the present invention.

According to this program, the computer can be functioned as the proxy requesting unit.

In an eighth aspect of the present invention, a program is to make a computer function as the proxy sending unit of the cable modem of the present invention.

According to this program, the computer can be functioned as the proxy sending unit.

In a ninth aspect of the present invention, a program is to make a computer function as the relevant information sending unit of the set top box of the present invention.

According to this program, the computer can be functioned as the relevant information sending unit.

In the meantime, each program discussed above includes a group of commands to be executed by the computer. These programs may be stored in ROM, or RAM for backup, and may be loaded to the computer from ROM, or RAM for backup to be used. Also, these programs may be loaded to the computer via the network to be used.

Moreover, these programs may be recorded on a computer-readable recording medium such as a flexible disk (FD), an optical disk (MO), a DVD, a CD-ROM, a Blu-ray disk, a HD-DVD, a hard disk and a memory card, and be loaded to the computer from these recording mediums to be used.

BRIEF DESCRIPTION OF THE DRAWINGS

An embodiment as the best mode to carry out the present invention will be described in detail below based on drawings.

THE BEST MODE TO CARRY OUT THE INVENTION

First Embodiment (1) Entire Configuration of CATV System 1

Figure 1:
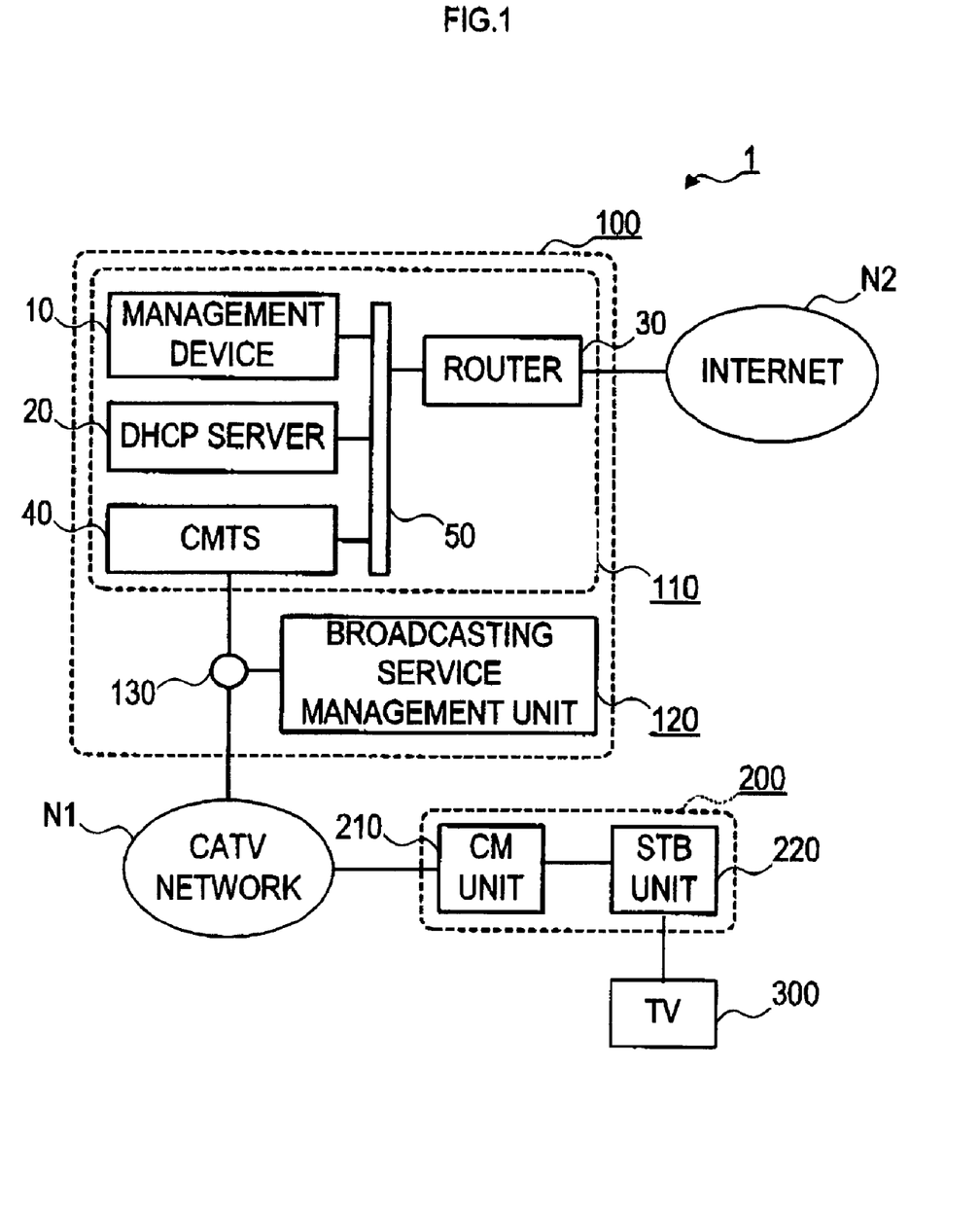
FIG. 1 is a block diagram showing a structure of a CATV system according to a first embodiment.

As shown in FIG. 1, a CATV system 1 is provided with a CATV center 100 and a plurality of set top boxes 200. The CATV center 100 and the set top boxes 200 are connected to one another via a CATV network N1. FIG. 1 shows only one of the set top boxes 200 in order to simplify an explanation.

The CATV center 100 is provided with a network management unit 110 and a broadcasting service management unit (i.e. headend) 120, and these are connected to the CATV network N1 via a mixer 130.

The network management unit 110 is provided with a management device 10, a DHCP server 20, a router 30 and a cable modem termination system (CMTS) 40, and these are connected to one another via a hub 50.

The management device 10 includes a well-known computer system. More specifically, the management device 10 is provided with a control unit 11, a memory unit 12 and a transmission unit 13 (see FIG. 2A). The control unit 11 includes a well-known CPU, a well-known main memory device (e.g. ROM, RAM) and a well-known peripheral circuitry (e.g. I/O). The control unit 11 executes various processes in accordance with various programs stored in the memory unit 12.

Figure 2A:
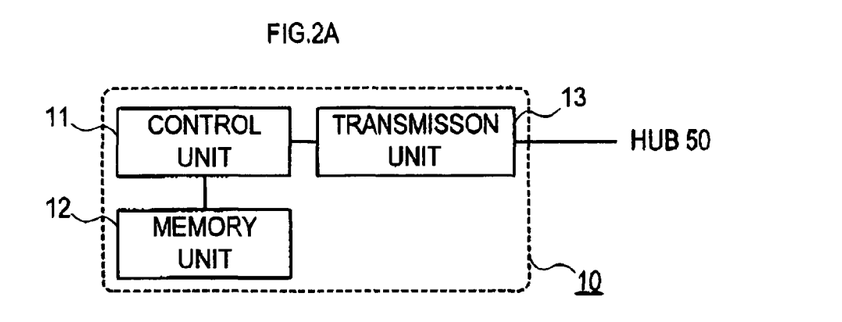
FIG. 2A is a block diagram showing a structure of a management device.

The memory unit 12 includes a well-known secondary memory device (e.g. a hard disk drive). The program for the control unit 11 to gather relevant information about the set top box 200 is preinstalled in the memory unit 12. More specifically, the relevant information in the present embodiment refers to a history of channels selected by a TV set 300, which will be described hereinafter, via the set top box 200, a signal level of selected channels, quality information about a SN ratio or a bit error rate of selected channels, and status information indicating a version of a software (a firmware) of the set top box 200.

The transmission unit 13 includes a well-known transmission interface.

The DHCP server 20 is a well-known DHCP server, and assigns an IP address to each apparatus on the CATV network N1 in accordance with DHCP (Dynamic Host Configuration Protocol).

The router 30 is a well-known router. The router 30 is connected to the network management unit 110 and an internet N2. The router 30 allows two-way communication between the network management unit 110 and the internet N2.

The CMTS 40 is a well-known CMTS. The CMTS 40 is connected to the network management unit 110 and the CATV network N1. The CMTS 40 allows two-way communication between the network management unit 110 and the CATV network N1 via the mixer 130.

The set top box 200 is integrally provided with a cable modem (CM) unit 210 and a set top box (STB) unit 220. The cable modem unit 210 and the set top box unit 220 are connected to one another.

The cable modem unit 210 is connected to the CATV center 100 via the CATV network N1 in addition to the set top box unit 220. The cable modem unit 210 functions as a so-called bridge, and relays the CATV network N1 and the set top box unit 220 at the level of the data link layer of the OSI (Open System Interconnection) reference model.

Figure 2B:
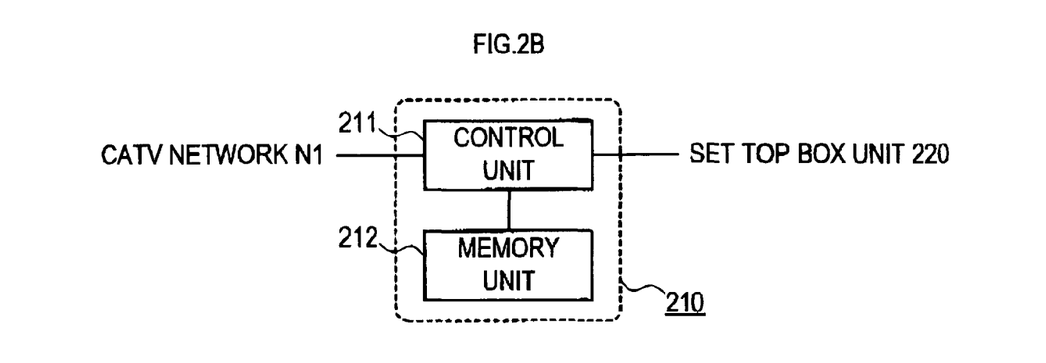
FIG. 2B is a block diagram showing a structure of a cable modem unit

More specifically, the cable modem unit 210 is provided with a control unit 211 and a memory unit 212 (see FIG. 2B).

The control unit 211 includes a well-known CPU, a well-known peripheral circuitry and a well-known transmission interface. The control unit 211 executes various processes in accordance with various programs stored in the memory unit 212.

The memory unit 212 includes a well-known main memory device. The memory unit 212 stores a database that various information is registered, a program for the control unit 211 to perform notification or change of information registered in the database according to a command from outside, and a program for the control unit 211 to set up an IP address, which is assigned to the cable modem 210 by the DHCP server 20, in the memory unit 12.

Moreover, the memory unit 212 stores the local addresses of the cable modem unit 210 and the set top box unit 220. The local addresses are only valid in a virtual network formed between the cable modem unit 210 and the set top box unit 220. In the present embodiment, the IP address and a MAC (Media Access Control) address are used as the local address.

The set top box unit 220 is connected to a TV set 300 in addition to the cable modem unit 221.

Figure 2C:
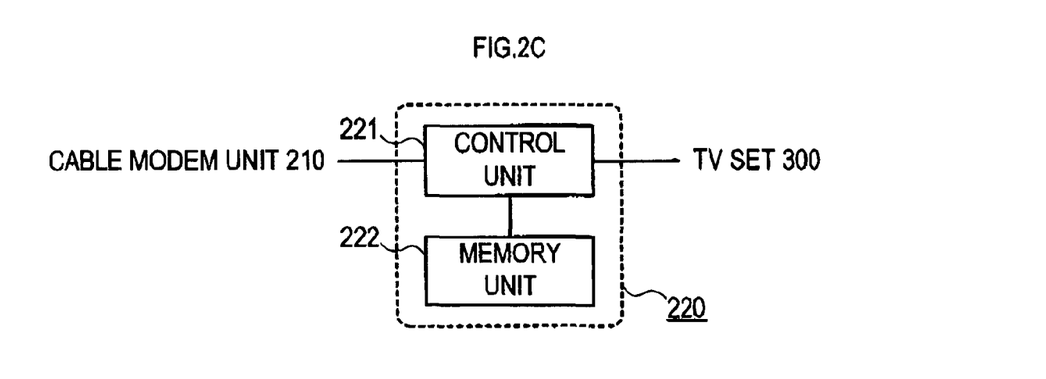
FIG. 2C is a block diagram showing a structure of a set top box unit.

More specifically, the set top box unit 220 is provided with a control unit 221 and a memory unit 222 (See FIG. 2C).

The control unit 221 includes a well-known CPU, a well-known peripheral circuitry and a well-known transmission interface. The control unit 221 executes various processes in accordance with various programs stored in the memory unit 222.

The memory unit 222 includes a well-known main memory device. The memory unit 222 stores a database that the relevant information is registered, a program for the control unit 211 to perform notification or change of the relevant information registered in the database according to a command from outside, and the local address of the set top box unit 220, and the local address of the cable modem unit 210.

(2) Process of Gathering the Relevant Information

Figure 3:
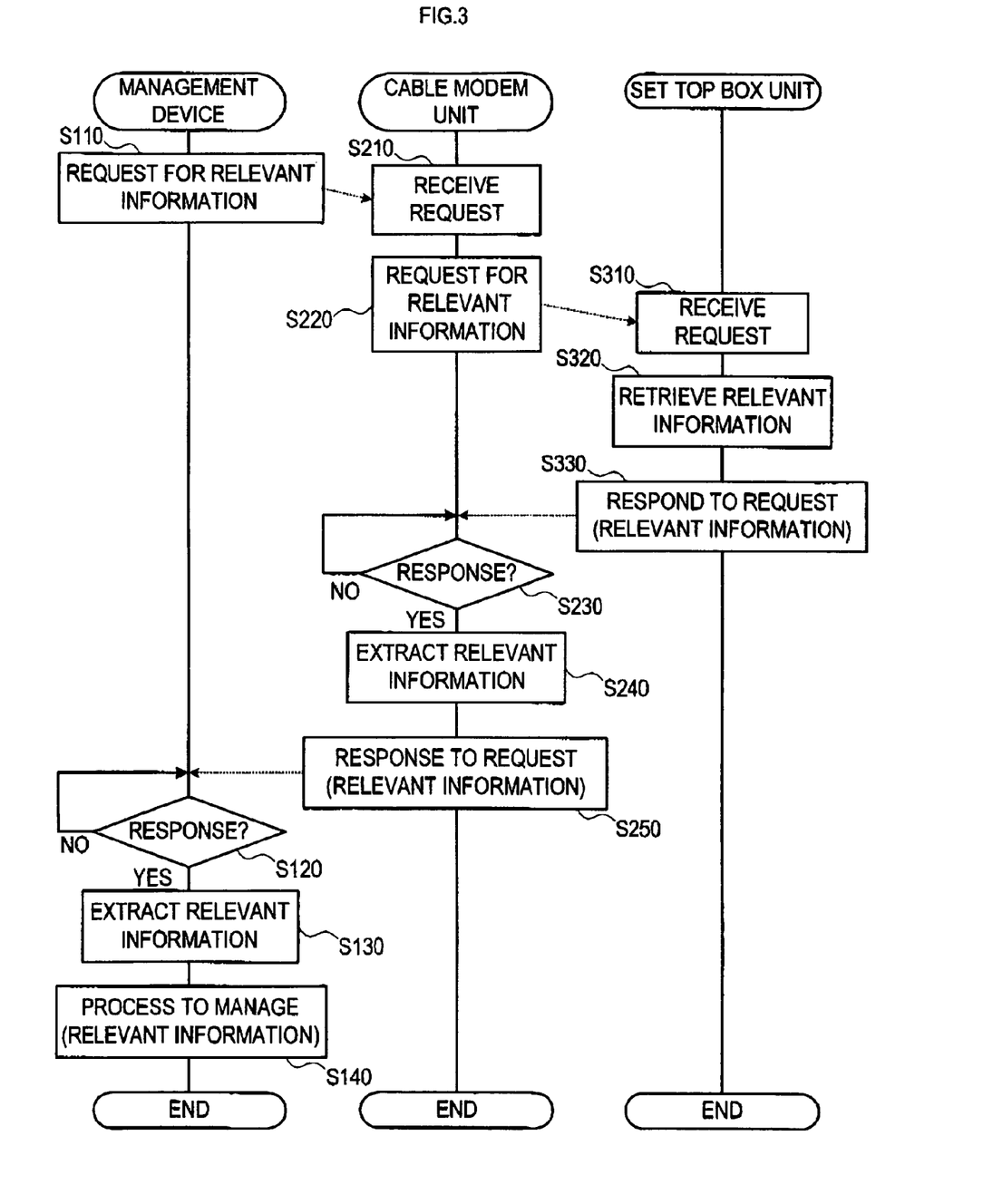
FIG. 3 is a flowchart illustrating processes being executed in the CATV system to gather relevant information according to the first embodiment

With reference to FIG. 3, processes to be executed by the control unit 11 of the management device 10, the control unit 211 of the cable modem unit 210 and the control unit 211 of the set top box unit 220 will be explained. These processes are executed when the management device 10 gathers the relevant information (the status information) from the set top box unit 220.

Firstly, the control unit 11 of the management device 10 sends a command for requesting the relevant information stored in the set top box unit 220 to the cable modem unit 210 (S110) and waits until the control unit 11 receives a response to the command from the cable modem unit 210 (S120: NO) when a timing for gathering the relevant information (e.g. a preset time or a timing for the operator to perform operation) comes. At S110, the control unit 11 sends the above command to destination assigned the IP address of the cable modem unit 210 (which is assigned by the DHCP server 20) that is managed by the CATV center 100.

Next, when the control unit 211 of the cable modem unit 210 receives the command from the management device 10 (S210), based on the command, the control unit 211 sends a command for requesting the relevant information to the set top box unit 220 connected to the cable modem unit 210 (S220), and waits until the control unit 211 receives a response to the command from the set top box unit 220 (S230: NO). At S220, the control unit 211 sends the above command to destination assigned the local address of the set top box unit 220.

Then, when the control unit 221 of the set top box unit 220 receives the command from the cable modem unit 210 (S310), based on the command, the control unit 221 retrieves the relevant information from the database in the memory unit 222 of the set top box unit 220 (S320) and sends the relevant information to the cable modem unit 210 as the response to the cable modem unit 210 (S330). At S310 to S330, the control unit 221 retrieves the relevant information from the database and sends the relevant information to destination assigned the local address of the cable modem unit 210, providing that the destination of the command received from the cable modem unit 210 is assigned the local address of the set top box unit 220.

Next, when the control unit 211 of the cable modem unit 210 receives the response from the set top box unit 220 (S230: YES), the control unit 211 extracts the relevant information from the response (S240) and sends the relevant information to the management device 10 (S250). At S230 to S250, the control unit 211 receives the response destined to the local address of the cable modem unit 210 and extracts the relevant information included in the response. Then, the control unit 211 sends the relevant information to destination assigned the IP address of the source of the command received (i.e. the management device 10) at S210.

When the control unit 11 of the management device 10 receives the response from the cable modem unit 210 (S120: YES), the control unit 11 extracts the relevant information from the response (S130) and executes a process for managing the relevant information (S140). At S140, the control unit 11 performs a process for compiling the relevant information and the like after storing the relevant information in the predetermined memory area of the memory unit 12 of the management device 10.

(3) Operation and Effect of the CATV System 1

As discussed above, in the CATV system 1, the cable modem unit 210 requests the set top box unit 220 to send the relevant information about the set top box unit 220 by proxy for the management device 10. Thereby, there is only need for the management device 10 to manage the IP address of the cable modem unit 210, and is no need for the management device 10 to verify the IP address of the set top box unit 220 when requesting to send the relevant information.

Therefore, according to the CATV system 1, the management device 10 enables to request the set top box unit 220 to send the relevant information without increasing processing load of the management device 10, Moreover, in the CATV system 1, the cable modem unit 210 receives the relevant information from the set top box unit 220 by proxy for the management device 10 and sends the relevant information to the management device 10. Thereby, the CATV system 1 enables the management device 10 to gather the relevant information without increasing processing load of the management device 10.

Furthermore, in the CATV system 1, transmission using the local address is held between the cable modem unit 210 and the set top box unit 220, and thereby the address of the set top box unit 220 can be specifically set.

That is, there is no need for the management device 10 to verify or update the IP address of the set top box unit 220 when the management device 10 gathers the relevant information.

Therefore, according to the CATV system 1, processing load of the management device 10 is reduced when the management device 10 gathers the relevant information about the set top box unit 220.

Moreover, in the CATV system 1, transmission between the cable modem unit 210 and the set top box unit 220 is implemented via the virtual network, which differs from the CATV network N1. Thereby, the CATV system 1 can prohibit leaking out the content of transmission between the cable modem unit 210 and the set top box unit 220 to the outside of the CATV system 1 via the CATV network N1 and thus the management device 10. Also, the CATV system 1 can prohibit consuming the band area of the CATV network N1 unnecessary.

Furthermore, in the CATV system 1, the management device 10 is set with the address of the cable modem unit 210, which is valid in the CATV network N1. The cable modem unit 210 is set with the address of the management device 10, which is valid in the CATV network N1, and the address of the set top box unit 220, which is valid in the virtual network. The set box unit 220 is set with the address of the cable modem unit 210, which is valid in the virtual network.

Due to the address settings discussed above, in the CATV system 1, the virtual network between the cable modem unit 210 and the set top box unit 220 can be reliably independent from the CATV network N1.

In the CATV system 1, the set top box 200 is an device that is configured to integrate with the cable modem unit 210, which functions as the cable modem, and the set top box unit 220.

That is, the connection between the cable modem unit 210 and the set top box unit 220 is fixed, and thereby the local addresses of the cable modem unit 210 and the set top box unit 220 can be preset.

For example, if these local addresses are preset at the time of factory shipment, there is no need for the user to set these local addresses to the set top box 200. Thereby, workload of the user can be relieved when the user uses the CATV system 1. Also, the CATV system 1 can be easily used by the user who has insufficient knowledge of setting the address.

Second Embodiment

Entire Structure of CATV System 2

A CATV system 2 is the CATV system 1 in the first embodiment with modification in some parts.

Therefore, in here, only structural and processing differences between the CATV system 1 and the CATV system 2 will be explained in detail, while the same numeral will be used for the same structures and processes, and the explanation for those will be abbreviated.

Figure 4:
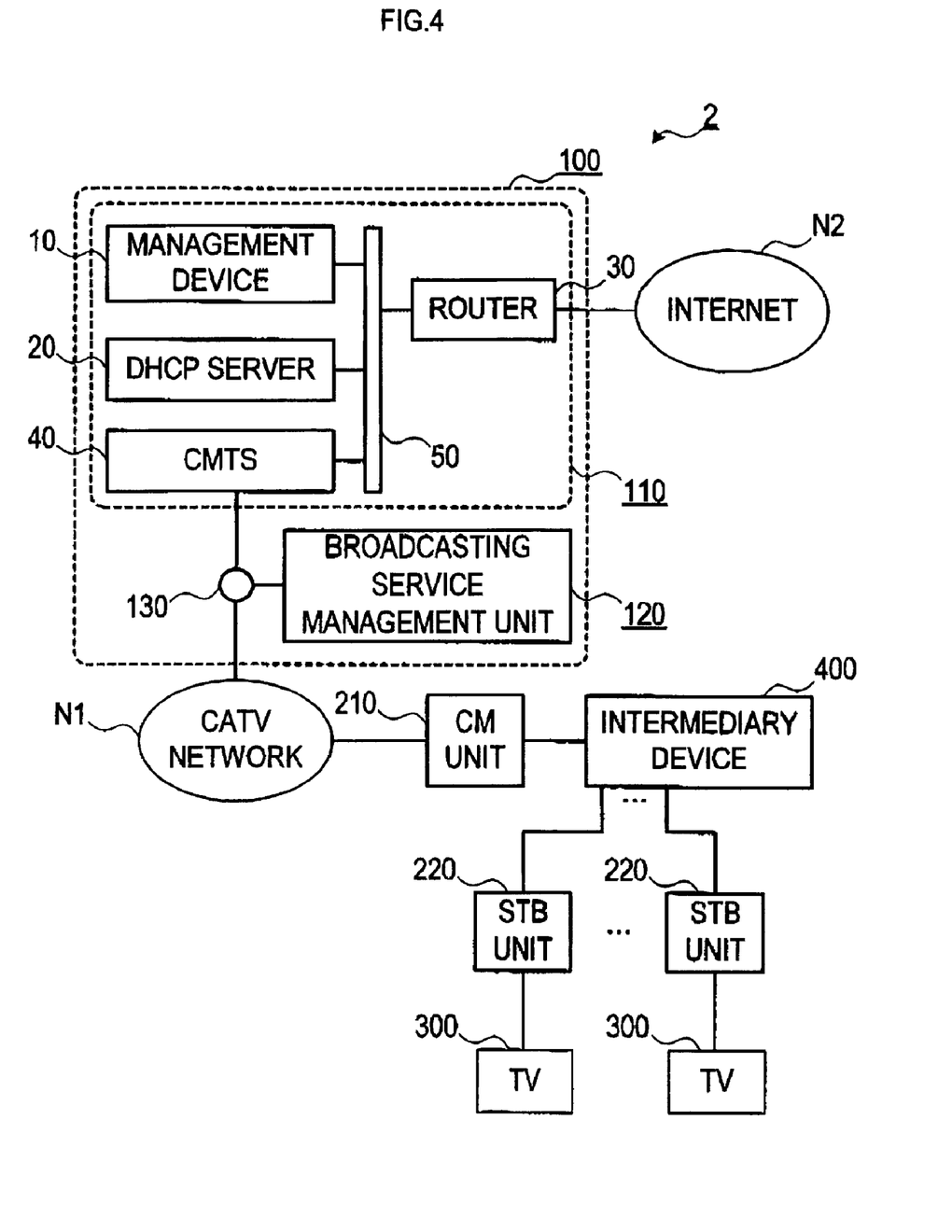
FIG. 4 is a block diagram showing a structure of a CATV system according to a second embodiment; and, FIG. 5 is a flowchart illustrating processes being executed in the CATV system to gather relevant information according to the second embodiment.

As shown in FIG. 4, the CATV system 2 is provided with a cable modem unit 210 and a set top box unit 220 as separate apparatuses that are independent from one another.

And, a plurality of set top box units 220 is connected to each cable modem unit 210 via an intermediary device 400 such as a hub and a router.

The number of the set top box units 220 connected to the cable modem unit 210 and identification numbers to specify these set top box units 220 are prestored in the memory unit 212 of the cable modem unit 210.

(2) Process of Gathering the Relevant Information

Figure 5:
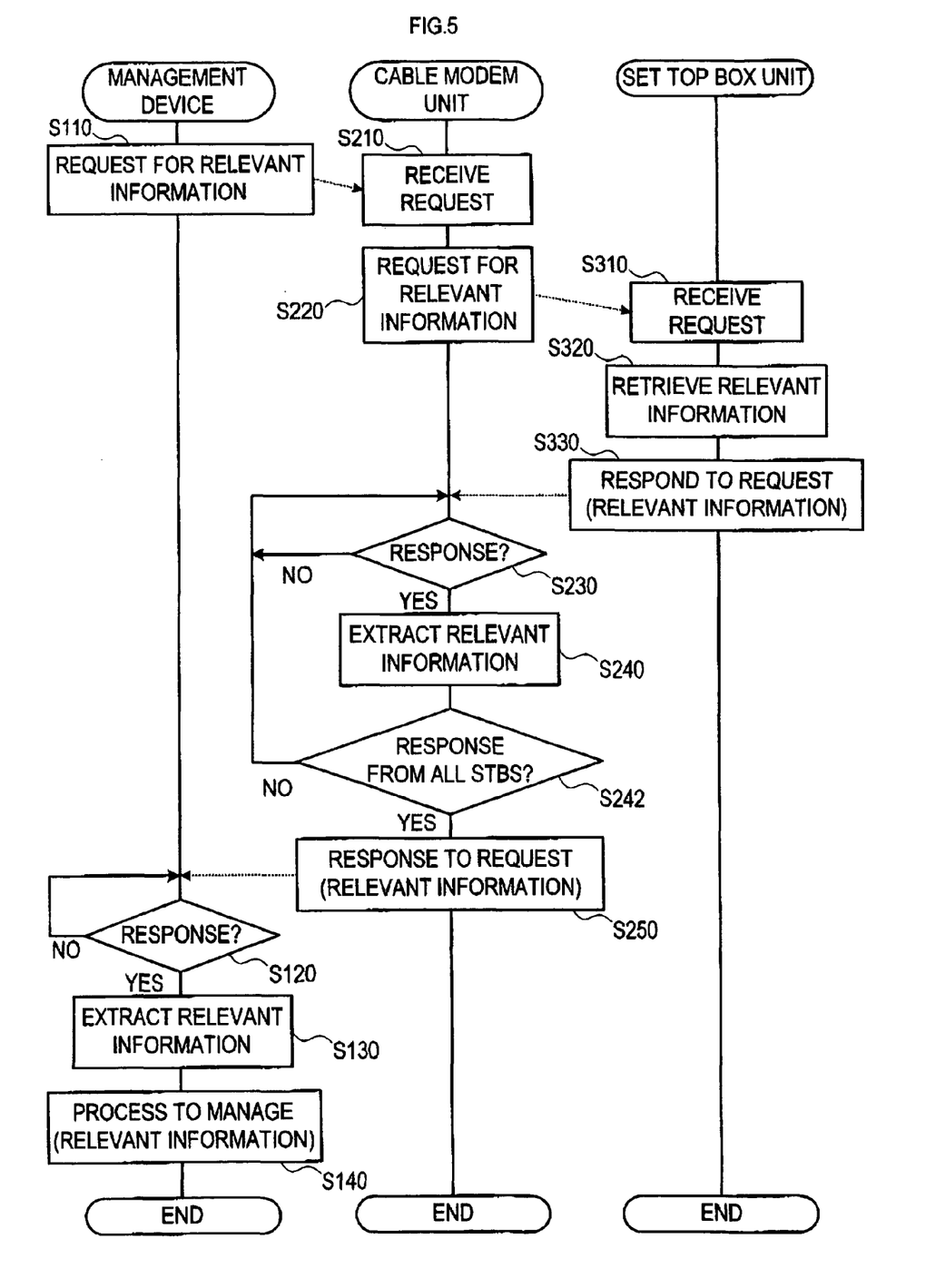

As shown in FIG. 5, when the control unit 211 of the cable modem unit 210 receives a request for the relevant information from the management device 10, the control unit 211 requests for the relevant information to all the set top box units 220 connected to the cable modem unit 210 (S220) and repeats processes of S230 and S240 until receiving responses from all the set top box units 220 (S242: NO). Then, when the control unit 211 receives the responses from all the set top box units 220 (S242: YES), the control unit 211 sends the relevant information about all the set top box units 220 to the cable modem unit 210 as the response to the command from the management device 10 (S250).

(3) Operation and Effect of CATV System 2

In the CATV system 2, the management device 10 can obtain the relevant information about the set top box units 220 without managing the addresses of all the set top box units 220 connected to the cable modem unit 210 as long as the management device 10 manages the address of the cable modem unit 210.

The cable modem unit 210 may regularly monitor whether or not the cable modem unit 210 can perform transmission with each set top box unit 220 connected to the cable modem unit 210 and request for the relevant information only to the transmissionable set top box unit 220.

3. Modification

Although the embodiments of the present invention have been described above, this invention is not limited to the first and the second embodiments discussed above. It will be obvious that this invention can take various forms without departing from the scope of this invention.

For example, in the first and the second embodiments, the relevant information refers to the status information about the set top box 200 (or the TV set 300). However, the relevant information may include information other than the status information.

Moreover, in the first and the second embodiments, the addressee of the relevant information of the set top box unit 220 is set to the cable modem unit 210. However, the addressee may be set to other than the cable modem unit 210. In this case, the management device 10 may gather the relevant information from the addressee other than the cable modem unit 210.

Furthermore, in the first and the second embodiments, the local addresses are set to the cable modem unit 210 and the set top box unit 220, and thereby the virtual network is formed between these two. However, the virtual network may be formed in a procedure other than setting the local address. For example, the virtual network may be formed by using a transmission protocol (e.g. IPv6) which differs from the transmission protocol used for the CATV network N1.

In the first and second embodiments, the CATV system 1 is provided with a single management device 10. However, the CATV system 1 may be provided with a plurality of the management devices 10.

Additionally, in the first and the second embodiments, the CPU is the component of the control unit 11 of the management device 10, the control unit 211 of the cable modem unit 210 and the control unit 221 of the set top box unit 220. However, an ASIC (Application Specific Integrated Circuit) or a Programmable Logic Device (e.g. FPGA and the like) and the like, for example, can be a component for those units instead of the CPU.

What is claimed is:

1. A CATV system comprising:
    at least one management device;
    at least one cable modem connected to the at least one management device via a CATV network; and
    at least one set top box physically connected to the at least one cable modem;
    wherein the at least one management device is configured to issue a request for the at least one cable modem to send relevant information about the at least one set top box, designating an address of the at least one cable modem instead of designating an address of the at least one set top box; and
    gather the relevant information sent from all of the at least one set top box; and
    the at least one cable modem includes:
        a memory unit that stores a number representing the number of the at least one set top box and an identification number corresponding to each of the at least one set top box to identify the corresponding at least one set top box;
        the at least one cable modem further requests each of the at least one set top box to send the relevant information based on the total number of the at least one set top box and the identification number of each of the at least one set top box which are stored in the memory unit, when the at least one cable modem is requested to send the relevant information from the at least one management device; and
    based on the number representing the number of the at least one set top box and the identification number of each of the at least one set top box, receives the relevant information sent from each of the at least one set top box, and, if a determination is made that a response has not been received from all of the at least one set top box, then the cable modem again looks for a response from each non-responding at least one set top box until receiving the relevant information from all of the at least one set top box;
    once the relevant information is received from all of the at least one set top box, the cable modem then sends all of the received relevant information from all of the at least one set top box to the at least one management device; and
    the at least one set top box retrieves the relevant information from a pre-reserved memory area and sends the relevant information to the at least one cable modem, when the at least one set top box is requested to send the relevant information from the at least one cable modem.

2. The CATV system according to claim 1, wherein the at least one management device requests the at least one cable modem to send the relevant information in accordance with a first transmission procedure; and
    the at least one cable modem requests the at least one set top box to send the relevant information in accordance with a second transmission procedure, which differs from the first transmission procedure.

3. The CATV system according to claim 1,
    wherein the at least one management device requests the at least one cable modem to send the relevant information in accordance with a first transmission procedure;
    the at least one management device gathers the relevant information from the at least one cable modem in accordance with the first transmission procedure;
    the at least one cable modem requests the at least one set top box to send the relevant information in accordance with a second transmission procedure, which differs from the first transmission procedure; and
    the at least one cable modem receives the relevant information from the at least one set top box in accordance with the second transmission procedure and sends the relevant information to the at least one management device in accordance with the first transmission procedure.

4. The CATV system according to claim 2, wherein the first transmission procedure is a transmission procedure that is usable for the CATV network; and
    the second transmission procedure is a transmission procedure that is usable for a network which is formed virtually between the at least one cable modem and the at least one set top box.

5. The CATV system according to claim 3, wherein the first transmission procedure is a transmission procedure that is usable for the CATV network;
   the second transmission procedure is a transmission procedure that is usable for a network which is formed virtually between the at least one cable modem and the at least one set top box.

6. The CATV system according to claim 4, wherein the at least one management device is set with an address of the at least one cable modem that is valid in the first transmission procedure; and
   the at least one cable modem is set with an address of the at least one set top box that is valid in the second transmission procedure.

7. The CATV system according to claim 5, wherein the at least one management device is set with an address of the at least one cable modem that is valid in the first transmission procedure;
   the at least one cable modem is set with an address of the at least one management device that is valid in the first transmission procedure and an address of the at least one set top box that is valid in the second transmission procedure; and
   the at least one set top box is set with an address of the at least one cable modem that is valid in the second transmission procedure.

8. A cable modem comprising:
   a memory unit that stores a number representing the number of at least one set top box physically connected to the cable modem and an identification number corresponding to each of the at least one set top box to identify the corresponding at least one set top box;
   the cable modem further requests each of the at least one set top box to send relevant information about the at least one set top box based on the total number of the at least one set top box and the identification number of each of the at least one set top box which are stored in the memory unit, when the cable modem is requested to send the relevant information from at least one management device connected to the cable modem via a CATV network; and
   based on the number representing the number of the at least one set top box physically connected to the at least one cable modem and the identification number of each of the at least one set top box, receives the relevant information sent from each of the at least one set top box, and, if a determination is made that a response has not been received from all of the at least one set top box, then the cable modem again looks for a response from each non-responding at least one set top box until receiving the relevant information from all of the at least one set top box physically connected to the at least one cable modem, and
   once the relevant information is received from all of the at least one set top box, the cable modem then sends all of the received relevant information from all of the at least one set top box to the at least one management device.

9. The cable modem according to claim 8, wherein the cable modem is integrated with at least one of the at least one set top box.

10. The cable modem according to claim 8, further comprising a non-transitory computer-readable storage medium that stores a program which when executed by the cable modem gathers information from all of the connected set top boxes.

11. A non-transitory computer-readable storage medium, that stores a program which, when executed,
   causes a cable modem, which includes a memory unit that stores a number representing the number of at least one set top box physically connected to the cable modem and an identification number corresponding to each of the at least one set top box to identify the corresponding at least one set top box, to gather information from all connected set to boxes; and
   further causes the cable modem to request each of the at least one set top box to send relevant information about the at least one set top box based on the total number of the at least one set top box and the identification number of each of the at least one set top box which are stored in the memory unit, when the cable modem is requested to send the relevant information from at least one management device connected to the cable modem via a CATV network;
   based on the number representing the number of the at least one set top box and the identification number of each of the at least one set top box, receive the relevant information sent from each of the at least one set top box, and, if a determination is made that a response has not been received from all of the at least one set top box, then again look for a response from each non-responding at least one set top box until receiving the relevant information from all of the at least one set top box; and
   once relevant information is received from all of the at least one set top box, then send all of the received relevant information from all of the at least one set top box to the at least one management device.

12. The CATV system according to claim 1, further comprising:
   a DHCP server; a cable modem termination system; a hub; and a mixer wherein the at least one management device is connected to the DHCP server and the cable modem termination system, via the hub, and the mixer is connected to the CATV network and the cable modem termination system.

13. The CATV system according to claim 12, further comprising a broadcasting service management unit connected to the mixer.

14. The CATV system according to claim 1, wherein the at least one set top box comprises a plurality of set top boxes.

15. The cable modem according to claim 8, wherein the at least one set top box comprises a plurality of set top boxes.

16. The non-transitory computer-readable storage medium according to claim 11, wherein the at least one set top box comprises a plurality of set top boxes.

17. The cable modem according to claim 8, further comprising a non-transitory computer-readable storage medium, that stores a program which, when executed by the cable modem, gathers information from all of the connected set top boxes.

* * * * *